(12) United States Patent
Kang et al.

(10) Patent No.: US 10,309,537 B2
(45) Date of Patent: *Jun. 4, 2019

(54) LINERLESS PRESSURE VESSEL BY CENTRIFUGAL FORCED WEAVING AND METHOD FOR MANUFACTURING THEREOF

(71) Applicants: Hyundai Motor Company, Seoul (KR); Kia Motors Corporation, Seoul (KR)

(72) Inventors: Hyun Min Kang, Gyeonggi-do (KR); Jong Kook Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 539 days.

This patent is subject to a terminal disclaimer.

(21) Appl. No.: 14/562,689

(22) Filed: Dec. 6, 2014

(65) Prior Publication Data

US 2015/0258740 A1 Sep. 17, 2015

(30) Foreign Application Priority Data

Mar. 12, 2014 (KR) .................. 10-2014-0029098

(51) Int. Cl.
*B29C 70/02* (2006.01)
*F16J 12/00* (2006.01)
(Continued)

(52) U.S. Cl.
CPC .............. *F16J 12/00* (2013.01); *B29C 53/72* (2013.01); *B29C 70/326* (2013.01); *D04H 3/073* (2013.01); *F17C 1/00* (2013.01); *F17D 3/16* (2013.01); *B29L 2031/7156* (2013.01); *F17C 2201/056* (2013.01); *F17C 2201/058* (2013.01); *F17C 2203/0617* (2013.01); *F17C 2203/0663* (2013.01); *F17C 2209/2154* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2270/0102* (2013.01); *F17C 2270/0105* (2013.01); *F17C 2270/0168* (2013.01); *F17C 2270/0178* (2013.01); *Y02E 60/321* (2013.01)

(58) Field of Classification Search
CPC ........ F16J 12/00; B29C 70/326; B29C 53/72; B29L 2031/7156; F17C 2203/0663
See application file for complete search history.

(56) References Cited

U.S. PATENT DOCUMENTS 3,765,557 A 10/1973 Giwer
3,900,355 A 8/1975 Goto et al.
(Continued)

FOREIGN PATENT DOCUMENTS

CN 103481522 A 1/2014
CN 104723569 A 6/2015
(Continued)

*Primary Examiner* — Robert J Grun
(74) *Attorney, Agent, or Firm* — Mintz Levin Cohn Ferris Glovsky and Popeo, P.C.; Peter F. Corless

(57) ABSTRACT

A method and an apparatus for manufacturing a linerless pressure vessel can be used for manufacturing a high pressure tank, by spinning of continuous fiber in a centrifugal direction.

16 Claims, 5 Drawing Sheets

(51) Int. Cl.
*F17C 1/00* (2006.01)
*F17D 3/16* (2006.01)
*B29C 53/72* (2006.01)
*D04H 3/073* (2012.01)
*B29C 70/32* (2006.01)
*B29L 31/00* (2006.01)

(56) References Cited

U.S. PATENT DOCUMENTS

| | | | | |
|---|---|---|---|---|
| 3,945,782 | A * | 3/1976 | Farahar | F16L 9/08 425/127 |
| 8,074,826 | B2 | 12/2011 | Cronin et al. | |
| 8,236,221 | B2 | 8/2012 | Pepper et al. | |
| 2001/0051484 | A1* | 12/2001 | Ishida | B32B 5/02 442/327 |
| 2005/0258575 | A1 | 11/2005 | Kruse et al. | |
| 2010/0230417 | A1 | 9/2010 | Berglund | |
| 2015/0174830 | A1* | 6/2015 | Lee | B29C 53/56 206/524.3 |

FOREIGN PATENT DOCUMENTS

| | | |
|---|---|---|
| EP | 1 593 904 A1 | 11/2005 |
| JP | 2001-288667 A | 10/2001 |
| JP | 2007-154927 A | 6/2007 |
| KR | 10-0857170 B1 | 9/2008 |
| KR | 10-1163538 B1 | 7/2012 |
| KR | 10-1271454 B1 | 8/2012 |
| KR | 10-2013-0159095 A | 12/2013 |
| WO | 92/21509 A1 | 12/1992 |
| WO | 20101151724 A2 | 12/2010 |
| WO | 2013/018237 A1 | 2/2013 |

* cited by examiner

| Gen. | Type I | Type II | Type III | Type IV | Type V |
|---|---|---|---|---|---|
| Liner | Steel | Steel/glass fiber | Aluminum | Polymer | Glass/carbon fiber composite [Linerless] |
| Outer layer | | | Glass/carbon fiber composite | Glass/carbon fiber composite | |
| Diagram | | | | | |
| Cost | - | - | 239% | 100% | 80~90% |
| Weight | 100% | 80% | 60% | 45% | 36~40% |
| Safety | Low | Low | Normal | High | High |
| Feature | Weight↑, internal corrosion problem | | Need to prevent galvanic corrosion | Lightweight, Excellent stability/durability | Ultra lightweight, Excellent stability/durability |
| Note | N/A | | | | - |

FIG.3

LINERLESS PRESSURE VESSEL BY CENTRIFUGAL FORCED WEAVING AND METHOD FOR MANUFACTURING THEREOF

CROSS-REFERENCE TO RELATED APPLICATION

This application claims under 35 U.S.C. § 119(a) the benefit of Korean Patent Application No. 10-2014-0029098 filed on Mar. 12, 2014, the entire contents of which are incorporated herein by reference.

BACKGROUND (a) Technical Field

The present disclosure relates to a method and an apparatus for manufacturing a linerless pressure vessel, which can be used for a high pressure tank, by spinning of continuous fiber in the centrifugal direction.

(b) Description of the Related Art

Because of the demand for linerless vessels, for example, a high pressure tank, and methods for manufacturing the same using shape memory foam are being developed. As a technique developed by Composite Technology Development Inc. (USA) in cooperation with the U.S. Air Force Research Laboratory and the University of Texas, a blow-type tank (1.9 L, diameter: 152 mm, length: 203 mm, 0.2 kg), which was installed on the FASTRAC 1 satellite, and has an operational pressure of 138 bar, a proof pressure of 690 bar and a burst pressure ranging from 1,300 to 1,700 bar, was manufactured by Multiple Use Precision Extractable Tooling (MUPET) technology using toughened epoxy by KIBOKO and T700 carbon fiber by Toray. The technology is conducted by firstly subjecting filament winding and then supporting it with shape-memory foam so as to maintain shape at room temperature and supply pressure for thermal curing. After completing curing, the shape-memory foam is shrunk at vacuum and cooling conditions, and extracted from the tank, and then the tank can be reused (see FIGS. 1 and 2).

As another reference for the method for manufacturing a high pressure vessel, US Patent Laid-Open Publication No. 2005-0258575 discloses a manufacturing method thereof by winding the prepared vessel with fiber and applying pressure to the interior of a mold for expansion molding.

Korean Patent Registration No. 10-0857170 discloses a blow molding equipment for liner production installed on a high pressure vessel, which is constructed to be coated with an adhesive on the undersurface of a parison wing for adhesion 410 integrally equipped to a nozzle 400, which can move forward and backward.

Further, U.S. Pat. No. 3,900,355 discloses an apparatus constructed that a nozzle tube 33 having resin discharging apertures 32 rotates by a motor 43 and resin solution is sprayed to the wall of a cylinder 30 by centrifugal force.

On the other hand, Korean Patent Registration No. 10-1271454 discloses a vessel manufactured by extruding mixed material to a mixed material export pipe where the mixed material can move and spraying to a mold through a nozzle, and simultaneously spraying glass fiber in the form of chopped strand cut to a predetermined length through a separate glass fiber nozzle.

However, any of the above-described technologies do not disclose a constitution, which winds the interior of a vessel, controls winding shape and physical properties at the same time, manufactures linerless pressure vessel, and has continuous manufacturing process.

The above information disclosed in this Background section is only for enhancement of understanding of the background of the invention and therefore it may contain information that does not form the prior art that is already known in this country to a person of ordinary skill in the art.

SUMMARY

The present invention provides a method for manufacturing a light linerless high pressure tank for storage of CNG, LPG, $H_2$ and the like by internal winding technology, and an apparatus therefor.

In one aspect, the present invention provides a method for manufacturing a high pressure tank installed with a three-dimensional blow fibrous structure woven with resin-impregnated fiber, wherein the resin-impregnated fiber is spun in a blow-shaped mold and settled in the inner surface of the mold; a spinning unit spinning the fiber moves and rotates along a moving shaft in the mold; the spinning is conducted in the circumferential direction by centrifugal force; and the three-dimensional blow fibrous structure is woven along the inner profile of the mold; and an apparatus for performing the method.

In a preferred embodiment, angular velocity of the spinning to the circumferential direction may be accelerated until the spun fiber reaches the inner surface of the mold.

In another preferred embodiment, a nozzle as a unit where the fiber is spinning at the spinning unit may be tilted.

In still another preferred embodiment, the woven shape of the blow fibrous structure and the density thereof may be estimated by path of the spinning fiber, tilting angle of the nozzle as a unit where the fiber is spinning at the spinning unit, moving velocity of the spinning unit and internal shape of the mold.

In yet another preferred embodiment, the woven thickness of the blow fibrous structure may become thicker as the spinning unit moves forward and backward repeatedly along the moving shaft.

In still yet another preferred embodiment, the present invention may further comprise compressing the textiles into the mold after weaving, or curing by heat, UV or dehydration after released from the mold.

In a further preferred embodiment, the resin may be at least one thermosetting resin selected from the group consisting of isophthalic polyesters, vinyl esters, epoxies, polyesters and polyurethanes.

In another further preferred embodiment, the fiber may be carbon fiber, glass fiber, aramid fiber or a mixture thereof.

In still another further preferred embodiment, the carbon fiber may have the crystal size of about 1 to 6 nm, which is measured by Wide-Angle X-ray Scattering (WAXS), and average single fiber diameter of about 1 to 20 μm.

In yet another further preferred embodiment, viscosity of the resin impregnated in the fiber may be 0.01 to 100 Pa·s.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other features of the invention are discussed infra.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein:

FIG. 3 is a table classifying pressure vessels by Type;

Figure 1:
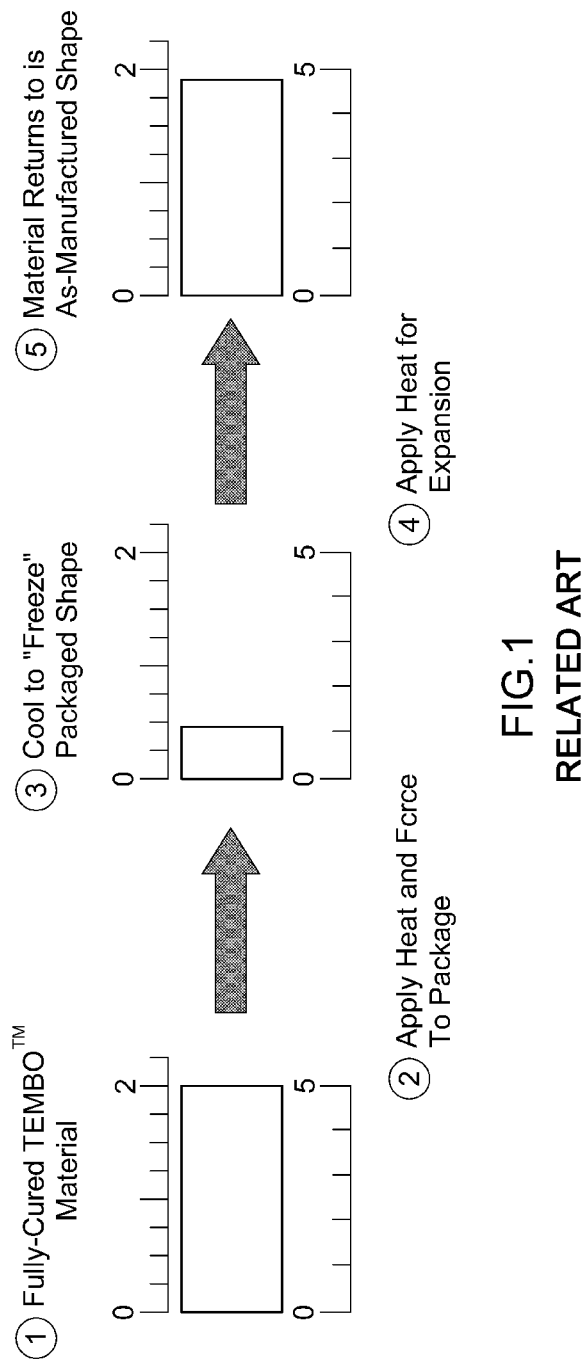
FIG. 1 (RELATED ART) is an image showing variation according to changes in temperature of shape-memory foam used in MUPET technology.
Figure 2:
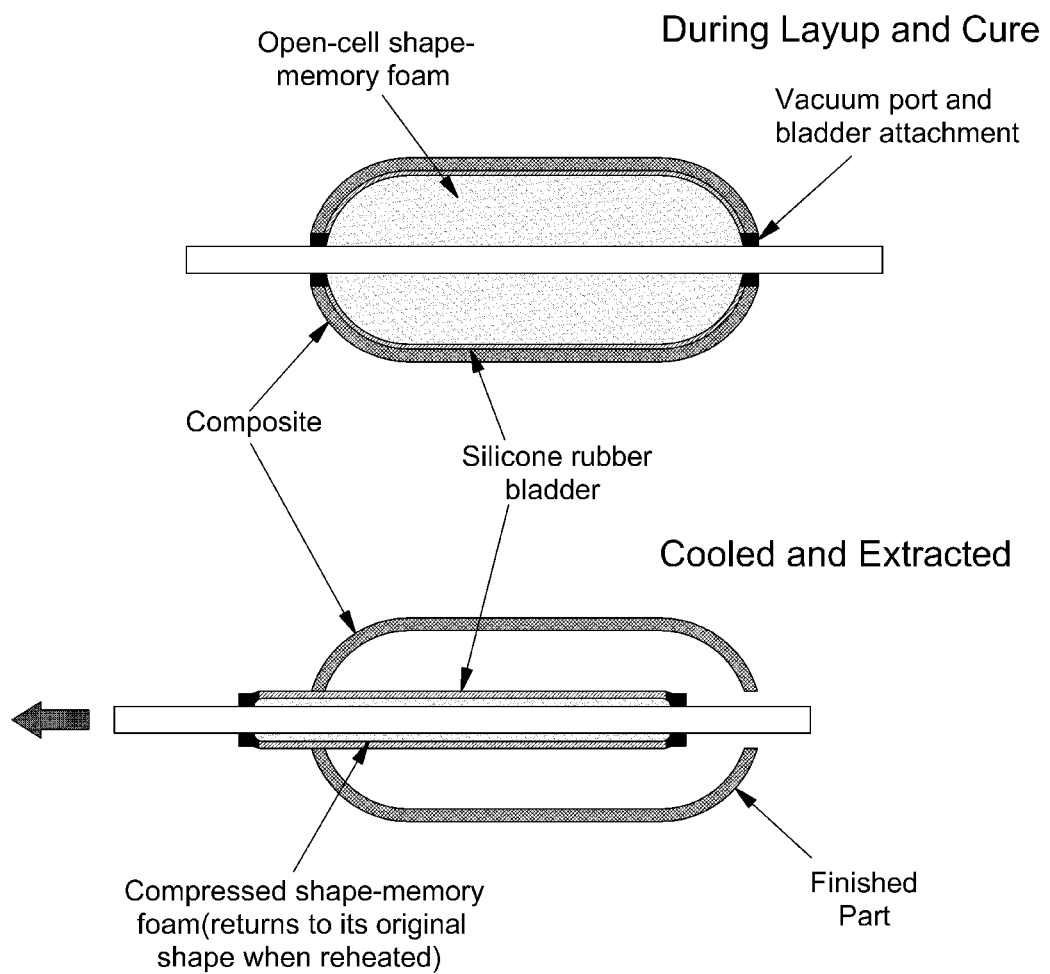
FIG. 2 (RELATED ART) is an image showing the method for manufacturing a linerless pressure vessel developed by the Composite Technology Development Inc. et al.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Pressure vessels may be classified by Type as shown in FIG. 3.

All-composite pressure vessel disclosed in U.S. Pat. No. 8,074,826 B2, which is incorporated by reference herein, may belong to Type V because polymer resin (toughened epoxy by KIBOKO), which has resistance to minute cracks when pressure over the burst displacement is applied, is subjected to filament winding or braiding.

The non-cylindrical pressure vessel disclosed in US 2010/0230417 A1, which is incorporated by reference herein, may belong to Type IV because a liner, which is divided to several sections, is wrapped with a fiber reinforcement liner.

The method for manufacturing a pressure vessel reinforced by continuous fiber winding disclosed in U.S. Pat. No. 3,765,557, which is incorporated by reference herein, is a technology enhancing fatigue durability characteristic by reinforcing the pressure vessel with braiding using Multi-filament, and may be applied for manufacturing Type III and IV.

Figure 4:
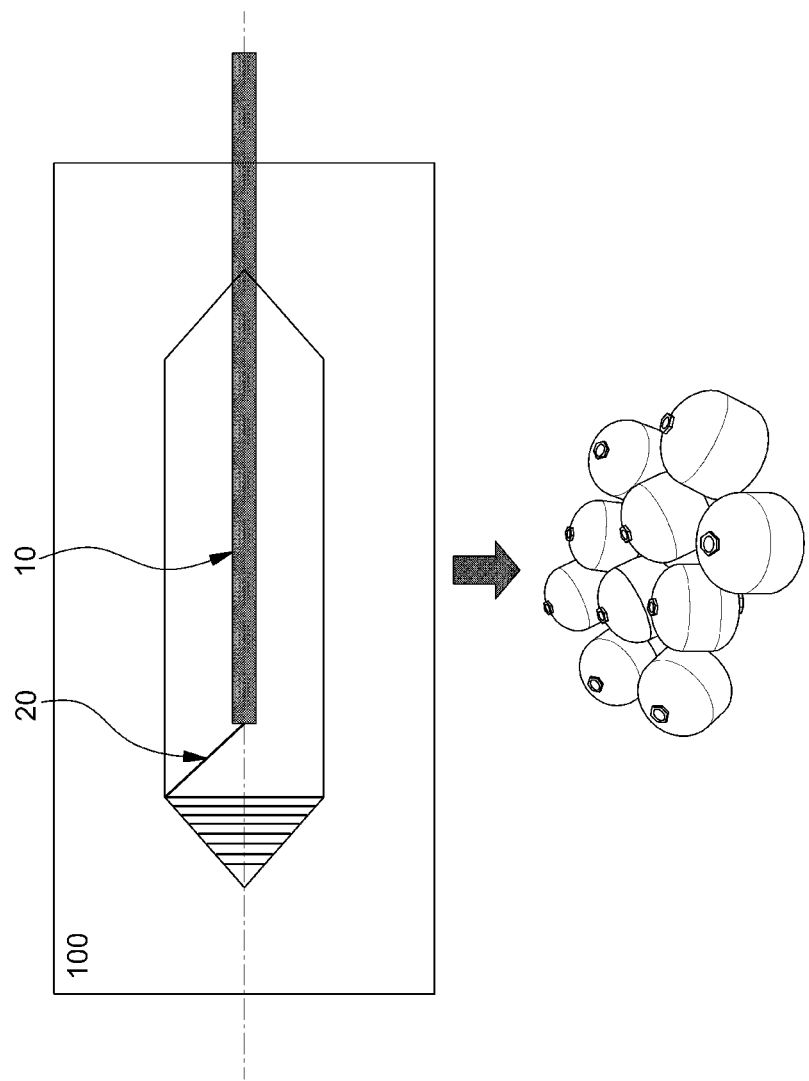
FIG. 4 is an image briefly describing a principle of manufacturing the linerless high pressure tank of the present invention.

The technology provided by the present invention may produce a linerless blow tank by rotating impregnated fiber spinning unit so as to make the spun fiber move in the circumferential direction by centrifugal force, and thereby winding or weaving the fiber along the internal shape of a mold (see FIG. 4).

The core technology for manufacturing a high pressure tank of Type V shown in FIG. 3 is to manufacture in a blow form by subjecting glass fiber or carbon fiber to filament winding or weaving without any metal or polymer liner. The existing patented process (MUPET) described above is performed by conducting filament winding using shape-memory foam as a liner followed by shrinking the shape-memory foam by cooling and extracting it from the interior.

The present invention enables to manufacture a Type V high pressure tank without a separate liner by rotating a spinning unit in the process of spinning impregnated fiber so as to generate centrifugal force to the fiber, thereby settling the woven or spun fiber in the interior of the tank-shaped mold.

Figure 5:
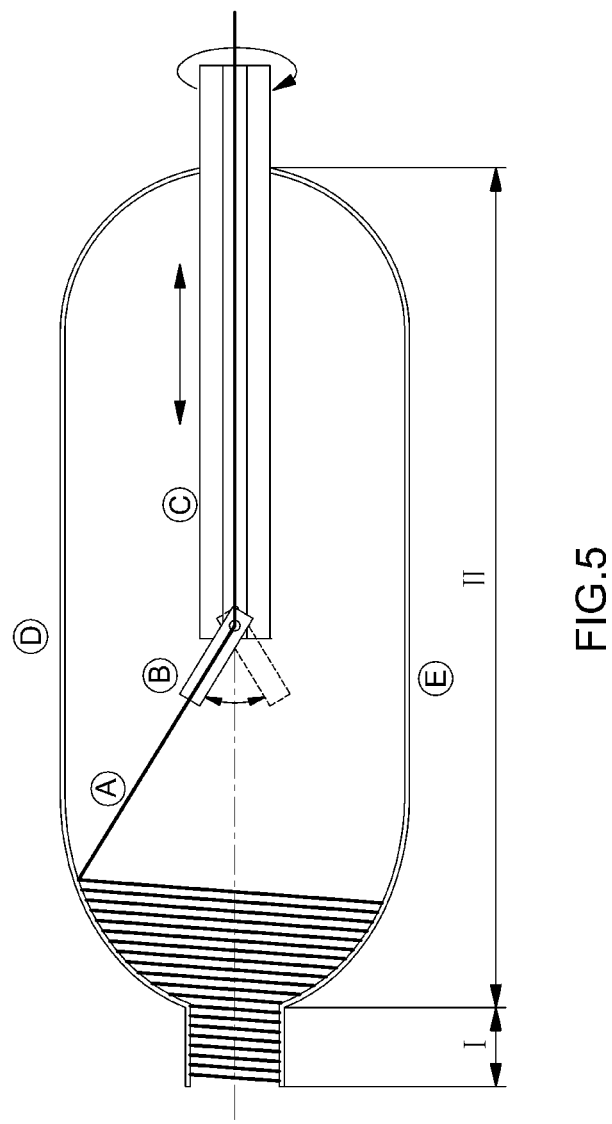
FIG. 5 is an image of the apparatus for manufacturing the linerless high pressure tank of the present invention.

More specifically, referring to FIG. 5, A represents fiber used for braiding or filament winding, which is resin-impregnated in the step before being spun from a nozzle B; B represents the nozzle for spinning the fiber, which is combined to C with the degree of freedom of 1 or 2, so as to be monoaxially or biaxially tilted at the tip of C;

C represents a spinning unit combined to B, whose center is blow, which can move forward and backward and rotate on the central axis, and wherein the fiber moves to the B through its blow part; and D and E represent a mold for manufacturing blow-type parts, which consists of the upper part D and the lower part E, and in which the fiber spun from B is wound or woven along the internal shape of the mold of D and E.

In the figure, the section "I" is a section for stabilizing path of the initially spinning fiber, and then the fiber may be spinning to a part with designed shape from the section II after the section I.

Angular velocity of the fiber spinning by rotary motion of C may be accelerated until the spun fiber reaches the inner surface of the mold.

The woven shape of the blow fibrous structure and the density thereof may be estimated by path of the spinning fiber, tilting angle of the nozzle B as a unit where the fiber is spinning at the spinning unit C, moving velocity of the spinning unit and internal shape of the mold, and the woven thickness of the blow fibrous structure may be controlled by moving the spinning unit C forward and backward repeatedly.

Since the spot in the mold where the fiber reaches may be controlled by moving 'C' forward and backward, the interior wall of the mold may be densely filled with the fiber spun from 'B' by controlling the motion of 'B' and 'C' together.

Basically, the path of the fiber may be easily estimated on the basis of information, for example, about the motion of 'B' and 'C' and the shape of the mold. Thus, in reverse, fiber spinning velocity and motor function of 'B' and 'C' may be calculated on the basis of the information about the mold shape.

Accordingly, when manufacturing a high pressure tank by using the present apparatus, at the beginning, the motor function of 'B' and 'C' for weaving or winding is automatically calculated, based on the mold shape information, and the apparatus is operated according to the function to make the final product.

Further, the thickness of the woven or wound wall may be controlled by repeatedly conducting the movement of 'C' forward and backward, and after completing weaving or winding, the mold is closed and cured by applying internal pressure with air pressure, or the woven or wound product may be separately cured after released from the mold, so as to make the final product.

In order to manufacture the blow-type high pressure tank using centrifugal spinning, a bundle of the fiber, wherein thermosetting resin is impregnated, is needed, and the thermosetting resin may be isophthalic polyesters, vinyl esters, epoxies, polyesters and polyurethanes. Such polymer resin may be contained in an amount of 20 to 70 wt %, preferably, and viscosity of the resin impregnated in the fiber may be 0.01 to 100 Pa·s (measured in accordance with KS M 3822 standard method), preferably. The bundle of the fiber, wherein thermosetting resin is impregnated, should be spun in the state of before curing, and in the state before curing, it may have adhesive force enough to be tightly adhered to the mold and kept due to the said viscosity mold.

For giving extra functions, the said thermosetting resin may further comprise flame retardant, antioxidant, thermo-stabilizer, lubricant, dye, pigment and inorganic filler.

The fiber may be carbon fiber, preferably, and the carbon fiber may have the crystal size of about 1 to 6 nm, which is measured by Wide-Angle X-ray Scattering (WAXS), and average single fiber diameter of about 1 to 20 μm, most suitable for the high pressure vessel in the terms of mechanical property.

It is characterized that glass fiber or aramid fiber also may be used instead of the carbon fiber, and two of them may be used in combination.

In manufacturing a linerless high pressure tank, the present invention simplified manufacturing process, reduced cost, and embodied lightweight tank at the same time.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a linerless tank installed with a three-dimensional blow fibrous structure woven with resin-impregnated fiber, comprising:
   the resin-impregnated fiber being spun in a mold and settled in an inner surface of the mold;
   a spinning unit spinning the fiber in a circumferential direction by centrifugal force;
   the spinning unit moving and rotating along a moving shaft in the mold; and
   the three-dimensional blow fibrous structure being manufactured in a blow form and woven along an inner profile of the mold, wherein
   a viscosity of the resin impregnated in the fiber is 0.01 to 100 Pa·s, and
   the resin is at least one thermosetting resin selected from a group consisting of: isophthalic polyesters, vinyl esters, epoxies, polyesters, and polyurethanes.

2. The method of claim 1, wherein an angular velocity of the spinning in the circumferential direction is accelerated until the spun fiber reaches the inner surface of the mold.

3. The method of claim 1, wherein a nozzle as a unit where the fiber is spinning at the spinning unit is tilted on an axis, and the axis is the spinning unit.

4. The method of claim 1, wherein the woven shape of the blow fibrous structure and a density thereof are estimated by a path of the spinning fiber, a tilting angle of the nozzle as a unit where the fiber is spinning at the spinning unit, a moving velocity of the spinning unit, and an internal shape of the mold.

5. The method of claim 1, wherein a woven thickness of the blow fibrous structure becomes thicker as the spinning unit moves forward and backward repeatedly along the moving shaft.

6. The method of claim 1, further comprising:
   compressing the textiles into the mold after weaving, or curing by heat, UV, or dehydration after being released from the mold.

7. The method of claim 1, wherein the fiber is carbon fiber, glass fiber, aramid fiber, or a mixture thereof.

8. The method of claim 7, wherein the carbon fiber has the crystal size of about 1 to 6 nm, which is measured by Wide-Angle X-ray Scattering (WAXS), and an average single fiber diameter of about 1 to 20 μm.

9. An apparatus for manufacturing a linerless high pressure tank installed with a blow fibrous structure as a resin-impregnated fiber textile, comprising:
   a fiber used for braiding or filament winding, which is resin-impregnated before being spun from a nozzle;
   the nozzle for spinning the fiber is combined with a spinning unit with a degree of freedom of 1 or 2, so as to be monoaxially or biaxially tilted at the tip of the spinning unit;
   the spinning unit configured to move forward and backward and rotate on a central axis, wherein the fiber moves to the nozzle through a blow part; and
   a mold for manufacturing blow-type parts, which includes an upper part and a lower part, and in which the fiber spun from the nozzle is wound or woven along the internal shape of the mold.

10. The apparatus of claim 9, wherein angular velocity of the fiber spun by the spinning unit is accelerated until the spun fiber reaches the inner surface of the mold.

11. The apparatus of claim 9, wherein the woven shape of the blow fibrous structure and the density thereof are estimated by a path of the spinning fiber, a tilting angle of the nozzle as a unit where the fiber is spun at the spinning unit, a moving velocity of the spinning unit, and an internal shape of the mold.

12. The apparatus of claim 9, wherein the woven thickness of the blow fibrous structure is controlled by moving the spinning unit forward and backward repeatedly.

13. The apparatus of claim 9, wherein the resin is at least one thermosetting resin selected from the group consisting of: isophthalic polyesters, vinyl esters, epoxies, polyesters, and polyurethanes.

14. The apparatus of claim 9, wherein the fiber is carbon fiber, glass fiber, aramid fiber, or a mixture thereof.

15. The apparatus of claim 14, wherein the carbon fiber has the crystal size of about 1 to 6 nm, which is measured by Wide-Angle X-ray Scattering (WAXS), and average single fiber diameter of about 1 to 20 μm.

16. The apparatus of claim 9, wherein viscosity of the resin impregnated in the fiber is 0.01 to 100 Pa·s.

* * * * *